May 10, 1955
H. H. POELMAN
2,708,137
CONVERTIBLE TOP LINER
Filed June 23, 1951
2 Sheets-Sheet 1
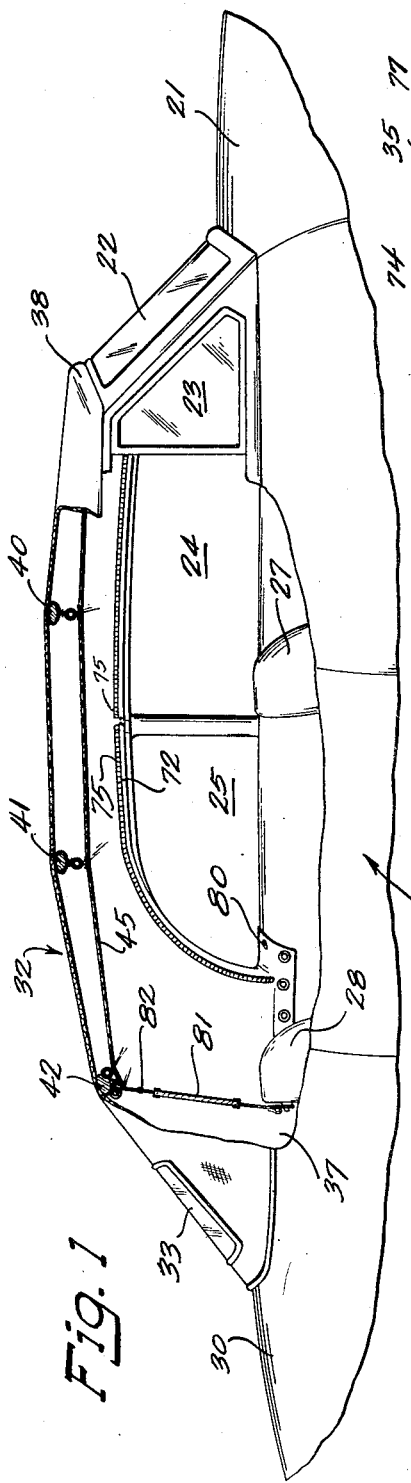
INVENTOR.
Herman H. Poelman
BY Eugene H. Simpson
Attorney May 10, 1955      H. H. POELMAN      2,708,137
CONVERTIBLE TOP LINER Filed June 23, 1951      2 Sheets-Sheet 2

INVENTOR.
Herman H. Poelman
BY
Attorney

United States Patent Office 2,708,137
Patented May 10, 1955

2,708,137

CONVERTIBLE TOP LINER

Herman H. Poelman, Racine, Wis.

Application June 23, 1951, Serial No. 233,145

1 Claim. (Cl. 296—107)

This invention relates to automobile tops and more particularly to an improved top for a convertible automobile.

It is a well known fact that the type of automobile commonly referred to as "a convertible," which has a collapsible cloth top, is cold and drafty in winter and excessively hot when the top is up during summer. That is, the car while having superior eye appeal, lacks the comforts of a sedan or other closed car.

It is an object of the present invention to improve the construction of convertible tops so as to provide a car which is warmer in winter and cooler in summer than present convertibles.

Another object is to provide an improved top for a convertible which will eliminate drafts in the car due to the fabric top.

A further object is to provide a liner for the fabric top of a convertible which may be folded into the top-well with the top when the top is down.

A further object is to provide an improved top for convertibles which will prevent the transfer of heat.

A still further object is to provide an improved top for a convertible which will insure increased comfort to the passengers.

A still further object is to provide a liner for a convertible top which may be sold as an accessory.

A still further object is to provide a convertible top for an automobile which will improve the appearance of the interior of the automobile.

Still further objects will become apparent upon considering the following specification, which, when taken in conjunction with the accompanying drawings illustrates a preferred form of the invention.

In the drawings:

Fig. 1 is a fragmentary elevational view of an automobile chassis of the type known as a "convertible," parts thereof being broken away to more clearly illustrate the invention;

Fig. 2 is a fragmentary view of the windshield of the automobile showing the connection of the forward end of the top liner;

Fig. 3 is a cross-section through the connecting bracket shown in Fig. 2;

Fig. 4 is a transverse cross-section taken through a top rib showing the bracket support for the liner;

Fig. 5 is a fragmentary view of the side of the car top showing the liner support;

Fig. 6 is a cross-section taken on the line 6—6 of Fig. 5, looking in the direction of the arrows;

Fig. 7 is a transverse cross-section through the rear rib of the top showing the supporting bracket for the liner;

Fig. 8 is a transverse section through the rear seat showing the securing of the rear end of the top liner.

Figure 9:
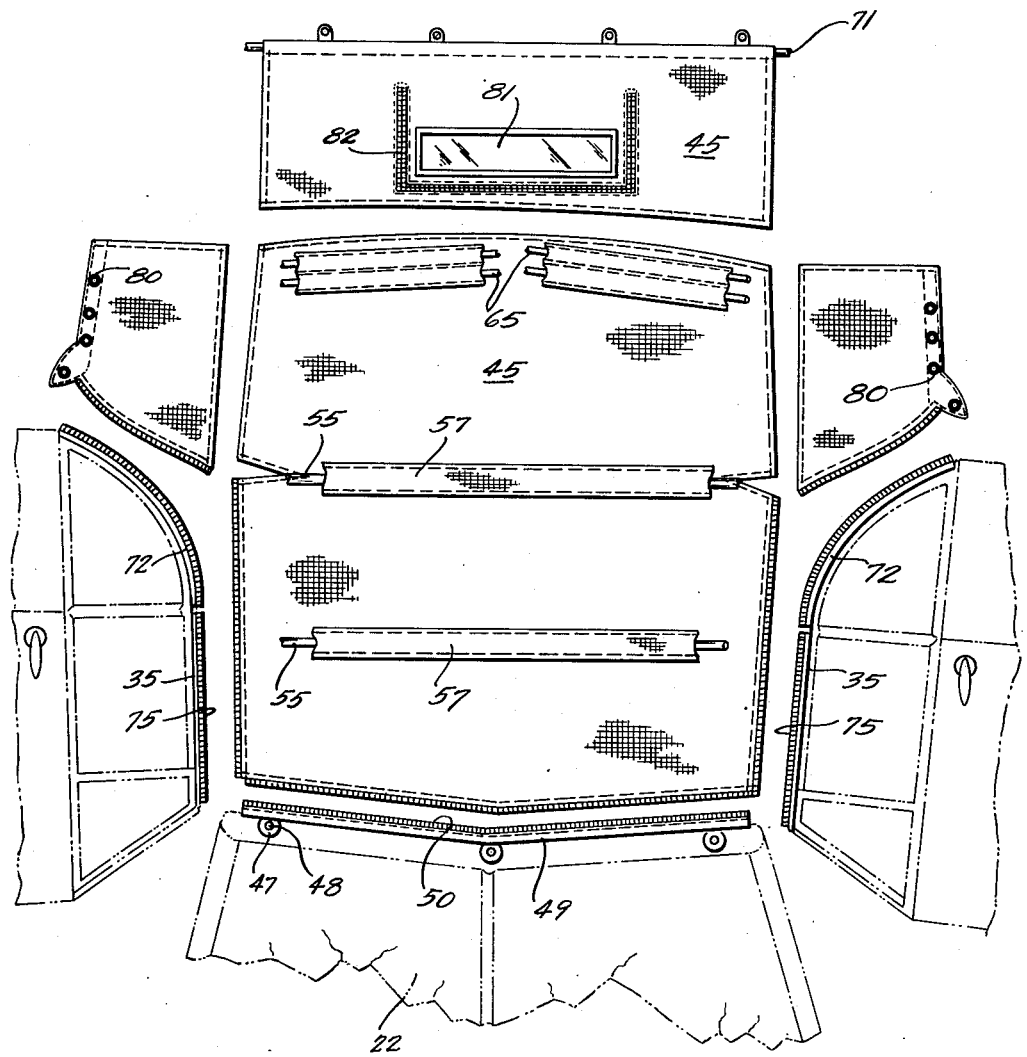
Fig. 9 is an exploded view of the top liner and supporting members.

Referring to the drawings and particularly to Fig. 1, the automobile which is of the type known as a convertible, has a body 20 including a hood 21, a windshield 22, a pair of wind guards 23 and a plurality of windows 24—25. Inside the car body are a front seat 27 and a rear seat 28 each of which accommodates two or more passengers. A luggage compartment in the rear of the body is covered by a hinged door 30.

The body is provided with a top 32 which is secured around the upper rear rim of the seat compartment. The top 32 which is provided with a rear vision window 33 is supported on a collapsible frame which comprises a pair of supporting side bars 35, hinged in the center to permit the top to fold back into a top-well 37, and a front rib 38 joining the side bars 35—35 and securable to the frame of the windshield 22, and a plurality of transverse ribs 40, 41 and 42 supporting the top between the front rib 38 and the rear of the machine.

The top 32 is provided with a liner, generally designated 45, of insulating material such as wool and may be made and sold with the car or may be sold as an accessory for installation at a later date.

At the front of the car is a rod 46 (Figs. 2 and 3) which conforms in shape to the front rib 38 and has brackets 47 which may be fastened permanently to the rib 38 or may be engaged over hooks 48 on top of the frame of the windshield 22. A piece 49 of liner material is sewed to form a loop and is received over the rod 46. A zipper or other slide fastener 50 is secured between the material 49 and the liner 45 and permits the liner 45 to be secured to the rod 46.

Refer now to Fig. 4, which illustrates the intermediate supports for the liner 45 on the ribs 40 and 41. Clamps, generally designated 52, each comprise mating members 53 and 53' and are held on the ribs 40 and 41 by bolts and nuts 54. The clamps also engage support rods 55 below the ribs. The rods 55 have cloth hanger strips 57 passing over the rods 55 and secured by stitching to the liner 45 to support the liner intermediate its ends.

The rear end of the liner 45 is supported as shown in Fig. 7. Referring to that figure, a bracket 60 comprises two identical pieces held on the rib 42 by a nut and bolt 61. Each half of the bracket 60 has a hook 63 formed on each end, the hooks 63 supporting a pair of rods 65 from the rib 42. Each of the rods 65 have straps 67 looped over the rods and secured to the liner 45 by stitching.

At the rear of the car the liner projects downwardly from the rear rib 42 and is secured on the back of the rear seat 28 on snap fasteners 70 (Fig. 8). A rod 71 sewed in a pocket in the liner 45 keeps the liner taut between the snaps 70.

The sides of the liner 45 are secured to fastening strips 72 as seen best in Figs. 5 and 6. The strips 72 are formed of loops which engage over longitudinal rods 74, the securing of the liner 45 to the strips 72 being by means of a zipper or other slide fastener 75. The rods 74 are secured to the side bars 35 by means of threaded hooks 77 which pass through a leg of the side bars 35 and are secured thereto by means of nuts.

The rods 74 are broken into segments the same length as the segments of the side bars 35 so as to enable the top to be folded back by merely undoing the zippers 75 and other fasteners.

On the inside of the car the liner extends downwardly to the body 20 of the car and is secured around the sides of the rear seat by snap fasteners 80 (Fig. 1).

If desired a rear window 81 may be inserted in the liner directly in front of the rear window 33 in the top 32. By securing the window 81 in the liner on three of its sides by means of a zipper 82 the window 81 may be opened to permit ventilation.

It will be realized that the hereinbefore described form of the invention is to be taken merely as a preferred embodiment thereof and that various changes in size, shape and arrangement of parts may be made without departing from the spirit of the invention or the scope of the subjoined claim.

That which is claimed as new and is desired to be secured by United States Letters Patent is:

In combination with a convertible automobile chassis including a seat and a collapsible top, said top including a fabric cover and a plurality of ribs supporting said cover, a rod supported from one of said ribs, a rod supported from another of said ribs, removable means to clamp said rods in fixed position relative to said ribs, a fabric liner supported from said rods, means to secure the ends of said liner between the forward end of the top and the rear of said seat, a plurality of support rods secured to each side edge of said top, said last named rods extending substantially between the joints in the top, and slide fasteners secured to each of said rods and to said liner and adapted to releasably secure the sides of the liners to said rods.

References Cited in the file of this patent
UNITED STATES PATENTS

| | | |
|---|---|---|
| 1,741,946 | Markee | Dec. 31, 1929 |
| 2,036,390 | Bowers | Apr. 7, 1936 |
| 2,418,918 | Yankus | Apr. 15, 1947 |